(12) United States Patent
Ebina et al.

(10) Patent No.: US 6,970,288 B2
(45) Date of Patent: Nov. 29, 2005

(54) MICRO-LENS SHEET AND PROJECTION SCREEN

(75) Inventors: Kazuyoshi Ebina, Kita-katsushika-gun (JP); Takashi Abe, Minami-saitama-gun (JP); Masaru Miyashita, Kashiwa (JP); Susumu Takahashi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 10/343,450

(22) PCT Filed: Jun. 3, 2002

(86) PCT No.: PCT/JP02/05434

§ 371 (c)(1),
(2), (4) Date: Jan. 31, 2003

(87) PCT Pub. No.: WO02/099530

PCT Pub. Date: Dec. 12, 2002

(65) Prior Publication Data

US 2004/0004770 A1 Jan. 8, 2004

(30) Foreign Application Priority Data

| Jun. 1, 2001 | (JP) | ................................. 2001-166402 |
| Mar. 29, 2002 | (JP) | ................................. 2002-94468 |
| Apr. 4, 2002 | (JP) | ................................. 2002-102169 |

(51) Int. Cl.$^7$ .................. G03B 21/60; G02B 27/10
(52) U.S. Cl. ........................ 359/455; 359/626
(58) Field of Search ................ 359/455, 456, 359/457, 619, 626, 628, 449

(56) References Cited

U.S. PATENT DOCUMENTS

| 4,076,384 A | * | 2/1978 | Deml et al. ................ 359/456 |
| 4,666,248 A | * | 5/1987 | van de Ven ................ 359/457 |
| 5,473,469 A | * | 12/1995 | Magocs et al. ............. 359/455 |
| 5,633,737 A | | 5/1997 | Tanaka et al. |
| 5,933,276 A | * | 8/1999 | Magee ....................... 359/455 |
| 6,301,051 B1 | * | 10/2001 | Sankur ....................... 359/626 |
| 6,469,830 B1 | * | 10/2002 | Dubin et al. ............... 359/457 |
| 2003/0112523 A1 | * | 6/2003 | Daniell ....................... 359/626 |

FOREIGN PATENT DOCUMENTS

| JP | 9-120101 | 5/1997 |
| JP | 9-269546 | 10/1997 |
| JP | 10-83029 | 3/1998 |
| JP | 2000-111708 A | 4/2000 |
| JP | 2000-131506 | 5/2000 |
| JP | 2001-33880 | 2/2001 |
| JP | 2001-033880 A | 2/2001 |

OTHER PUBLICATIONS

Canadian Office Action issued Jul. 13, 2005 in corresponding Canadian Application No. 2,417,925.

* cited by examiner

Primary Examiner—Christopher Mahoney
(74) Attorney, Agent, or Firm—Staas & Halsey LLP (57) ABSTRACT

In order to provide a micro-lens sheet in which unit lenses are disposed in highly accurate pitch so as to control the light diffusing characteristics of the light emission direction not only in a horizontal direction but also over 360 degrees by using the lens function of one piece of lens sheet, a micro-lens sheet has a micro-lens array section in which unit lenses are disposed in approximate matrix in a second dimensional manner on at least one surface of a base board, and the micro-lens array section is formed on only one surface of the base board, the micro-lens array section includes the unit lens having an aspherical shape, and disposition pitch of neighboring unit lenses is 200 μm or shorter.

14 Claims, 9 Drawing Sheets

LENS THICKNESS

MAXIMUM SCALE : +/− 20.000 MICRONS
TRANSVERSE RAY PAN PLOT

MAXIMUM SCALE : +/− 5.000 MICRONS
TRANSVERSE RAY PAN PLOT

EXPOSURE DISTRIBUTION IN BM SURFACE OF ASPHERICAL LENS

MICRO-LENS SHEET AND PROJECTION SCREEN

TECHNICAL FIELD

The present invention relates to a micro-lens sheet. The present invention particularly relates to a micro-lens sheet which is preferable to be used for an image displaying screen (transmission projection screen or a rear-projection screen) for a rear-projection television apparatus.

Also, the present invention relates to a projection screen using a lens array sheet which is used for a rear-projection display (television/display) such as a liquid-crystal projection television/display.

BACKGOURND ART

Commonly, in a transmission projection screen, a Fresnel lens sheet and a lenticular sheet are assembled.

A Fresnel lens sheet emits a light (which disperses from a small-diameter lens) which is projected from a projector to a lenticular sheet as an approximate parallel light by using a converging lens.

The lenticular sheet widens horizontally a range of the projected light which is incident as an approximate parallel light by the Fresnel lens sheet so as to emit to a person who observes the light by using a characterized feature of a cylindrical lens group which are disposed in horizontal direction.

Also, in a rear-projection screen, customarily, a light diffusing layer is formed for purposes of widening a display light in a vertical direction, making the projected light from the projector focused, and reducing unnecessary blinking which is called a scintillation in the image because of small diameter of the lens in the projector.

The light diffusing layer is formed in at least any one among a lenticular sheet, Fresnel lens sheet, or a front board such as a protection board. For forming the light diffusing layer, methods such as applying methods, layering methods, and mixing methods can be employed preferably.

Recently, in place of a projector which is according to a CRT method having three-tube-method, liquid-crystal projector or a displaying device using a single-tube projector according to a reflection-light-bulb method such as a digital-micromirror-device (hereinafter called DMD, Trademark is registered by Texas Instrument) or a digital-light-processing device (hereinafter called DLP device, Trademark is registered by Texas Instrument) are popular. For these new devices, preferable rear-projection-screen has been required.

The applicant for the present invention has proposed a rear-projection-screen having a lenticular sheet which is disclosed in documents such as Japanese Unexamined Patent Application, First Publication, No. Hei9-120101, Japanese Unexamined Patent Application, First Publication, No. Hei8-269546, Japanese Unexamined Patent Application, First Publication, No. Hei 10-83029. These rear-projection-screens relate to a lenticular sheet which are provided a cylindrical lens group which are disposed in horizontal direction. Therese rear-projection-screen are required to be provided with a light diffusing layer having a sufficient light-diffusion in any one of the cylindrical lens group.

As explained above, in a conventional lenticular sheet, it is possible to control perspective angle (range) of the displaying light only in horizontal direction by using function of the lens. The control in vertical direction depends on a light diffusing layer.

Although effect of the control of the perspective angle by using the lens function is high and dynamic, effect of the control of the perspective angle by using the light diffusing layer is relatively low and softened.

Commonly, a light diffusing layer is formed by mixing a light diffusing particle in a resin. It is difficult to select combination such as refractive indexes between the light diffusing particle and the resin, diameter of the light diffusing particle (and its distribution), and diffusion characteristics. It is also difficult to control the light diffusing characteristics in only vertical direction from a structural point of view. Thus, it is inevitable that the light diffusing characteristics in a horizontal direction receive influence.

Also, it is necessary to mix excessive light diffusing particle for enhancing the light diffusing characteristics. Therefore, reduction in the transmitted light (decrease in displaying brightness) is caused; thus, product cost increases.

Also, attempt for enhancing the light diffusing characteristics in horizontally and vertically by using the lens function was made conventionally. However in addition to a lens sheet for controlling the light diffusing characteristics in a horizontal direction, adding a lens sheet for controlling the light diffusing characteristics in a vertical direction may cause a difficulty in aligning both lenses for setting the screen. Also, such factors may cause increase in the product cost because structural member increase.

A method in which a lens sheet which can control the light diffusing characteristics in non-horizontal direction by using the lens function in a screen containing a Fresnel lens sheet and the lenticular sheet instead of a lenticular sheet is disclosed in a document such as Japanese Unexamined Patent Application, First Publication, No. 2000-131506.

A proposal in the above document is a lens sheet which is provided with a micro-lens array section in which layers of micro-lens having optically symmetrical convex or concave shape which are disposed in a diamond-shape. In this proposal, it is necessary that a diffusing sheet layer is disposed near emission surface. Otherwise, a sheet layer in which a diffusing member is contained in the micro-lens array section is necessary.

In the above new device, as represented by an XGA standard, in order to provide a high-resolution image quality, more fine resolution for a panel (such as a liquid crystal or a micro-mirror array) for regulating the projected image is sought according to an increase in pixels. More fine resolution in parallel disposition pitch of the cylindrical lens group is required for a screen.

Also, along with realization in finer resolution in parallel disposition pitch for a unit lens, finer resolution for a light transmitting section in a shading pattern (Black Matrix hereinafter called BM) which is formed away from the lens section has been realized. Therefore, accuracy for forming an aperture section in a light condensing section where a light is condensed by the micro-lens array section clearly is required.

In case of a lens sheet having a fine pitch lens section, a black matrix is formed by so called a self-alignment method in which positions of non-light-condensing section for the lens are determined accurately by using light condensing characteristics by the lens to a photosensitive resin layer which is formed on the lens sheet away from the lens.

For self alignment method, there are a wet method in which the shading pattern is formed after developing the exposed photosensitive resin layer, or a dry method in which the shading pattern is formed applying a color without developing the exposed photosensitive resin layer.

In dry method, a photosensitive adhesion agent having a characteristics in which bonding characteristics occurs according to whether or not light is exposed is used, and a color is applied corresponding to the adhesion.

In order to form a BM having preferable shading ratio (for obtaining preferable contrast in image, a range such as more than 60% is experimentally preferable) for a transmission liquid crystal projection screen, the position of light condensation (focus) by the lens section is set preferably according to the shading ratio in the formed pattern in the photosensitive resin layer not on the light emission of the photosensitive resin layer.

In a case in which a lens is spherical, positions of focal point are different between in the center of the lens and marginal area of the lens according to aberration. Therefore, in a case in which the shading pattern is formed by the self alignment method, the position where the characteristics of the photosensitive resin layer changes cannot be determined precisely. Therefore, a borderline between the aperture section and the shading section is hardly clear.

In particular, in a case in which the shading ratio is enhanced so as to realize an image with higher contrast, there is a problem in that it is difficult to form a BM having a clear borderline between a fine aperture section and the shading section when parallel disposition pitch between the unit lens is very fine and each one of the unit lens is fine.

In a conventional light transmission screen which is used in a rear-projection television which is sold in a market, it is common that a Fresnel lens having a concentric gaps are formed on one surface and a lenticular lens in which cylindrical lenses are disposed in one direction are provided. A case in which either one of them is used is acceptable. Also a case in which a light diffusing layer is provided on other member can be common.

In members which is contained in these transmission screens, optical disposition is arranged such that the lights which are emitted from the projector are in approximate parallel state by the Fresnel lens so as to obtain horizontal perspective angle by widening the emitted light in a horizontal direction in the image by the lenticular lens and vertical perspective angle by widening the emitted light in a vertical direction in the image by the light diffusing member.

Furthermore, a transmission screen which can obtain a brighter and clearer image quality is known by replacing the lenticular lens by a micro-lens sheet which can obtain the horizontal perspective angle and the vertical perspective angle compatibly without using the light diffusing member and by discontinuing or reducing the use of the light diffusing member.

Also, a method in which two lenticular layers are used such that longitudinal directions of the cylindrical lenses are orthogonal, or a method in which the cylindrical lenses are disposed on both surfaces of one base member layer such that the longitudinal directions of the cylindrical lenses are orthogonal are known.

Also, a structure in which a shading layer having aperture sections is provided in a light condensing section of each of the cylindrical lens contained in the lenticular lens or in the light condensing section of each of the micro-lens contained in the micro-lens array sheet so as to improve SIN ratio of the screen is known.

Also, there is a case in which a hardcoat layer or a anti-reflection layer (hereinafter called AR layer) are provided an outermost surface according to a usage of these transmission screen.

In a transmission screen using a conventional lenticular sheet or a micro-lens sheet, a lenticular layer and a diffusion layer are combined so as to control the perspective angle in a horizontal direction and a vertical direction. In the micro-lens array, wider perspective angle is necessary; therefore, there are disadvantages such as deteriorated quality in the image due to absorption of light by the diffusion layer and white scattering, and reduced screen gain caused by wide diffusion.

Also, it is possible to propose to control the perspective angle in a horizontal direction and a vertical direction by using two lenticular layer in which longitudinal direction of each cylindrical lenses are orthogonal, or by disposing a plurality of cylindrical lens on both surfaces of one base member layer such that longitudinal directions of each of the cylindrical lens are orthogonal. In such cases, quantity of the members contained in the cylindrical lens becomes doubled, and very fine manufacturing process for lens also becomes doubled. Thus, there is a problem in that cost for parts and manufacturing process become expensive.

Also, in a screen in which two lenticular lenses are disposed on one plane surface so as to be orthogonal each other, two lenticular lenses overlap each other. Therefore, if shape of one lenticular lens changes, optical characteristics in the other lenticular lens changes accordingly. Thus, it is not possible to control the perspective angle by independently changing the shape of one of the lenticular lenses. Therefore, there is a limit for controlling range for the perspective angle; thus, such a limit is not preferable from practical point of view.

Furthermore, in order to use a micro-lens array for a transmission screen, it is necessary to produce in a worthwhile size for the purpose such as 50 inches in diagonal plane. In such a case, a lens thug (thickness of refractive surface) having nearly half a diameter of an element lens is necessary for obtaining wider perspective angle. However, it is difficult to compatibly realize such depth in lens thug and picture size because of the depth to be molded. Because of this, even if necessary optical performance can be realized as long as an image area is small, due to a problem in manufacturing process, it is difficult to enlarge the image area.

DISCLOSURE OF INVENTION

The present invention was made in consideration of above problems. An object of the present invention is to provide a micro-lens sheet in which it is possible to control light diffusing characteristics not only in a horizontal direction but also over 360 degrees by lens function of one piece of lens sheet. Another object of the present invention is to provide a micro-lens sheet in which is preferable for manufacturing a rear projection screen containing two pieces of lens sheet in combination with a Fresnel lens sheet without using a lot of light diffusing agent. Yet another object of the present invention is to provide a micro-lens sheet which is preferable to observe high resolution quality image such that unit lens groups are disposed in very fine pitch.

Yet another object of the present invention is to provide a micro-lens sheet which can control an emission direction of the display light emitted from the lens section in a wider perspective range (scope) by disposing the unit lens groups in fine pitch such as 200 $\mu$m or finer in a micro-lens sheet which is preferable for a lens sheet to be used for a transmission projection screen containing two pieces of lens sheet in combination particularly with a Fresnel lens sheet.

Yet another object of the present invention is to provide a micro-lens sheet which can easily form a fine BM in which a borderline between an aperture section and the shading section is clear when a BM having a high shading ratio (75%) is formed on a micro-lens sheet away from the lens section.

Yet another object of the present invention is to provide a projection screen using a micro-lens having sufficient optical characteristics for a screen with less optical absorption, less gain reduction, and controlled white scattering easily with large area.

Yet another object of the present invention is to provide a projection screen using a micro-lens of which material cost and manufacturing cost are inexpensive.

A first aspect of the present invention is a micro-lens sheet having a micro-lens array section in which unit lenses are disposed in approximate matrix in a second dimensional manner on at least one surface of a base board wherein the micro-lens array section is formed on only one surface of the base board, the micro-lens array section includes the unit lens having an aspherical shape, and disposition pitch of neighboring unit lenses is 200 μm or shorter.

In order to dispose a unit lens group in a fine pitch, it is preferable that the micro-lens array section is molded by a radioactive-ray-curable-resin.

In this aspect of the present invention, it is acceptable that a micro-lens sheet has a micro-lens array section in which unit lenses are disposed in approximate matrix in a second dimensional manner on at least one surface of a base board wherein the micro-lens array section is formed such that a reacted product of a radioactive-ray-curable-resin is bonded on only one surface of the base board, the micro-lens array section includes the unit lens having an aspherical shape, and disposition pitch of neighboring unit lenses is 100 μm or shorter.

It is acceptable that, in a micro-lens sheet, the micro-lens array section has only the unit lens having aspherical shape.

Any variation in disposition of the unit lens may be acceptable. A matrix disposition which is neatly disposed in grid form, a delta disposition in which the distance between the unit lenses is uniform, a honeycomb disposition in which shape of the unit lens is a hexagon using the delta disposition can be acceptable.

Also, a disposition in which an array n and an array n+1 (n is an integer) contained in the lens array section in the matrix disposition are in an offset disposition by half a pitch. A shape of the unit lens area may be a rectangle or a triangle. A triangle formed by neighboring unit lens areas can be a regular triangle sometime, and it cannot be a regular triangle sometime. By using such different cases, it is possible to change the light diffusion characteristics in a horizontal direction and a vertical direction. In order to improve contrast in a displayed image which is supposed to be observed in a rear projection screen, it is preferable that a shading layer is formed on a position on a surface of the base board which is disposed away from the micro-lens array section where a light is not condensed by each of unit lens.

A second aspect of the present invention is a micro-lens sheet having a micro-lens array section in which unit lenses are disposed in approximate matrix in a second dimensional manner on at least one surface of a base board wherein diameter for each of the unit lens and the disposition pitch is 200 μm or shorter, light emission angle which is emitted from each unit lens is more than ±30 degrees against a normal of a main surface of the micro-lens sheet; chromatic difference of magnification which is caused by each unit lens is designed to be in a range of 0% <chromatic difference of magnification ≦50% of the diameter of the lens.

A third aspect of the present invention is a projection screen having the micro-lens sheet having the micro-lens array section in which the unit lenses are disposed in an approximate matrix in a second-dimensional manner wherein a surface of the unit lens is formed in toric shape as a continuous surface such that curvature of cross sectional shape of the unit lens in one direction is smaller than that in an orthogonal direction to the particular direction, the micro-lens array section in which the unit lens is disposed in an approximate matrix in a second-dimension manner is formed on one surface of the transparent sheet, and the shading layer having the aperture section of which optical axis is aligned with the optical axis of unit lens group on a surface of the sheet which is disposed opposite to the micro-lens array section.

In a fourth aspect of the present invention, it is characterized in that, in a projection screen, directions of the curvature of each unit lens are uniformly disposed when the micro-lens array section in which the unit lens is disposed in an approximate matrix in a second-dimension manner is formed on one surface of the transparent sheet.

In a fifth aspect of the present invention, it is characterized in that, in a projection screen, lens thug of the toric surface which is a ratio between thickness of a curvature section in a one direction and thickness of a curvature section in a cross sectional surface in an orthogonal direction is 2/3 or smaller.

In a sixth aspect of the present invention, it is characterized in that, in a projection screen, lens thug of the toric surface which is a ratio between thickness of a curvature section in a horizontal direction and thickness of a curvature section in a cross sectional surface in a vertical direction is 2/3 or smaller.

In a seventh aspect of the present invention, it is characterized in that, in a projection screen, the micro-lens array section is formed on one surface of the transparent sheet which is disposed in an area from which a light is incident (near a projector) when the micro-lens array section is used for a transparent projection screen.

In an eighth aspect of the present invention, it is characterized in that, in a projection screen, the shading layer is formed in the non-light-condensing area on a surface of a base board opposite to the lens such that a light does not condense by exposing a light through the micro-lens array section, the photosensitive resin layer or a layer which is formed on a surface of the photosensitive resin layer is a base board for a lens such that the refractive index of the layer is lower than that of the transparent sheet.

In a ninth aspect of the present invention, it is characterized in that, in a projection screen further has a Fresnel lens having a concentric ring band near a light incident region (near a projector) when the projection screen according to a first aspect of the present invention is used for a transparent projection screen.

BEST MODE FOR CARRYING OUT THE INVENTION

Before explaining embodiments of the invention, here, light-condensing characteristics corresponding to a shape of the unit lens and chromatic difference of magnification are explained.

Figure 3A:
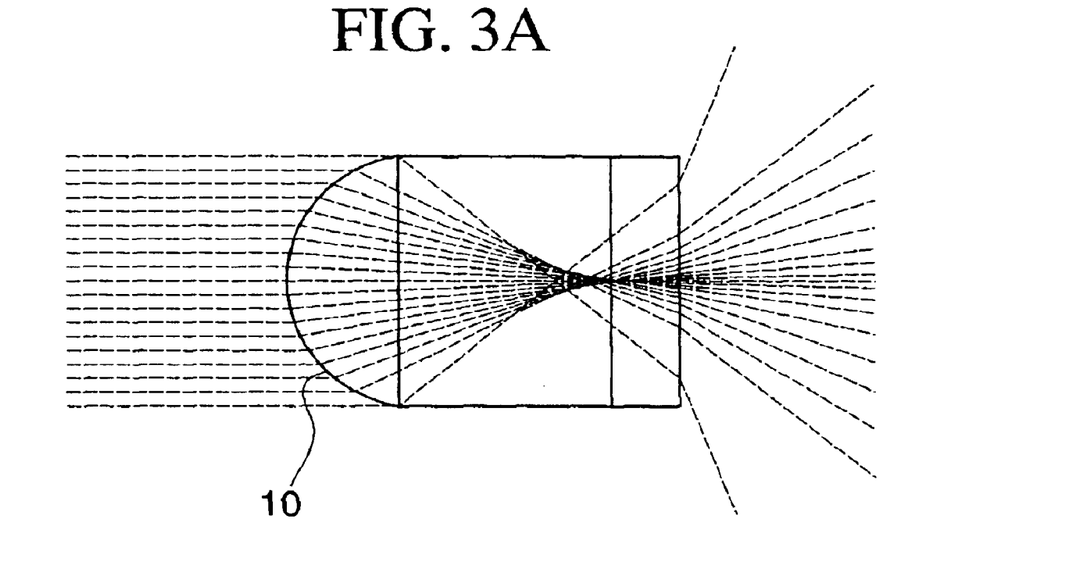
FIG. 3A is a cross section showing an optical path in a case in which a unit lens has a spherical shape (conventional technique).
Figure 3B:
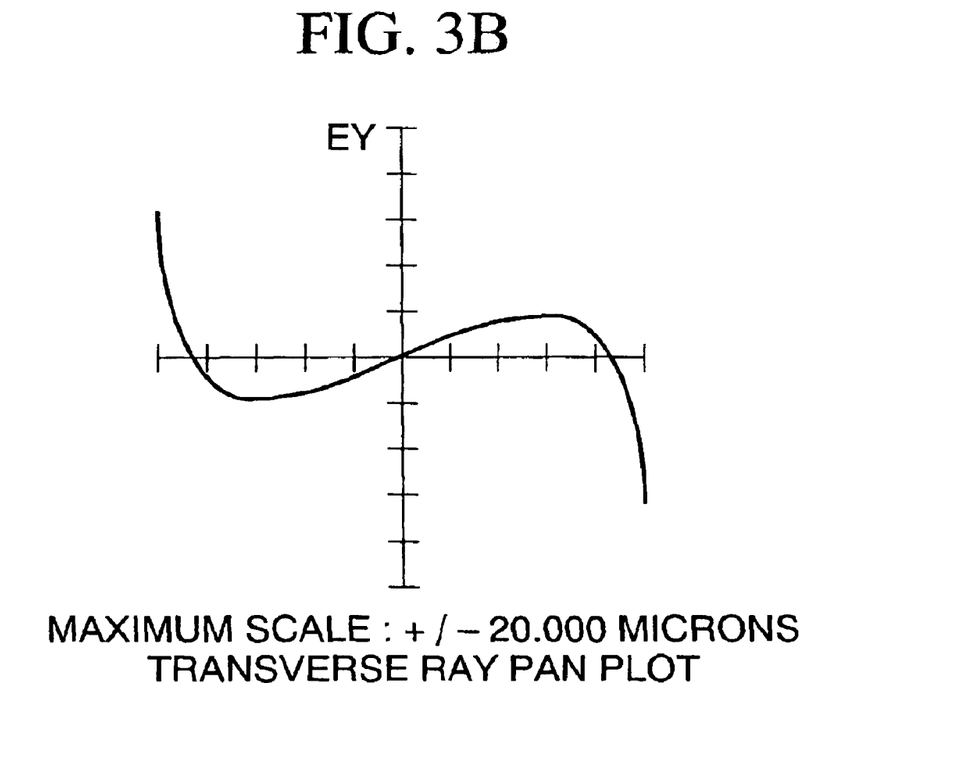
FIG. 3B is a graph showing chromatic difference of magnification.
Figure 4A:
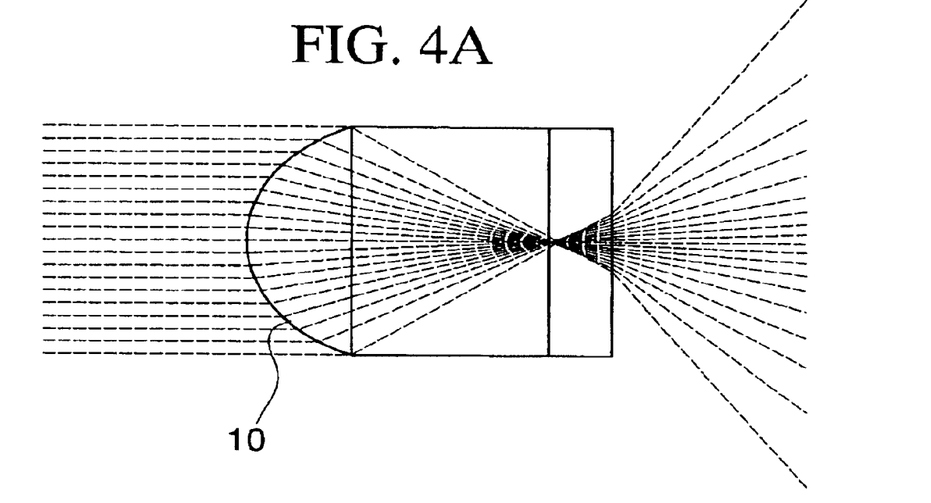
FIG. 4A is a cross section showing an optical path in a case in which a unit lens has an aspherical shape as defined as the present invention.
Figure 4B:
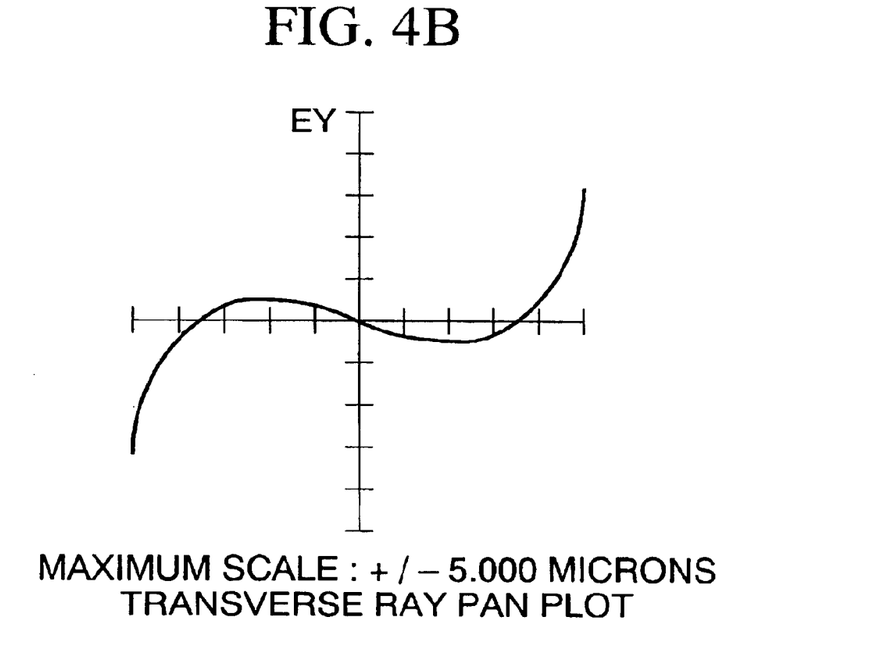
FIG. 4B is a graph showing chromatic difference of magnification.

FIG. 1 is a cross section showing an optical path in a case in which a unit lens has a spherical shape (FIG. 3A) and a graph showing chromatic difference of magnification (FIG. 3B). FIG. 4A is a cross section showing an optical path in a case in which a unit lens has an aspherical shape as defined as the present invention. FIG. 4B is a graph showing chromatic difference of magnification.

According to FIG. 3, parallel lights which are incident to a unit lens 10 from a left-hand-side of the drawing are incident to a surface of a unit lens, and the parallel lights are refracted, then the parallel lights are condensed so as to be focused in a right-hand-side of the drawing. After that, the light is emitted so as to be spread in vertical direction as shown in the drawing.

In this case, the focal length of the lights which are incident in a central area of the unit lens is long (position of focus point is in a right-hand-side in the drawing), and the focal length of the lights which are incident in a marginal area of the unit lens is short (position of focus point is in a left-hand-side in the drawing) because of aberration due to a spherical lens. This is called an axial chromatic aberration.

On the other hand, because of aberration due to a spherical lens, a graph for showing a chromatic difference of magnification: FIG. 3A is obtained under condition that a center of the unit lens is plotted in a horizontal axis such that y=0, and a distance between a position where a the emitted light and a light emitting surface cross is plotted as Δy on a vertical axis (EY) such that when y=0, then Δy=0.

FIGS. 4A and 4B show a case in which the unit lens has a shape in which there is less aberration due to spherical lens. As shown in FIG. 4A, in this case, focus points approximately coincide over a central are to marginal area on the unit lens (there is a less axial chromatic aberration). Accordingly, FIG. 4B indicates that there is a little fluctuation in EY; thus, there is less chromatic difference of magnification.

Figure 6:
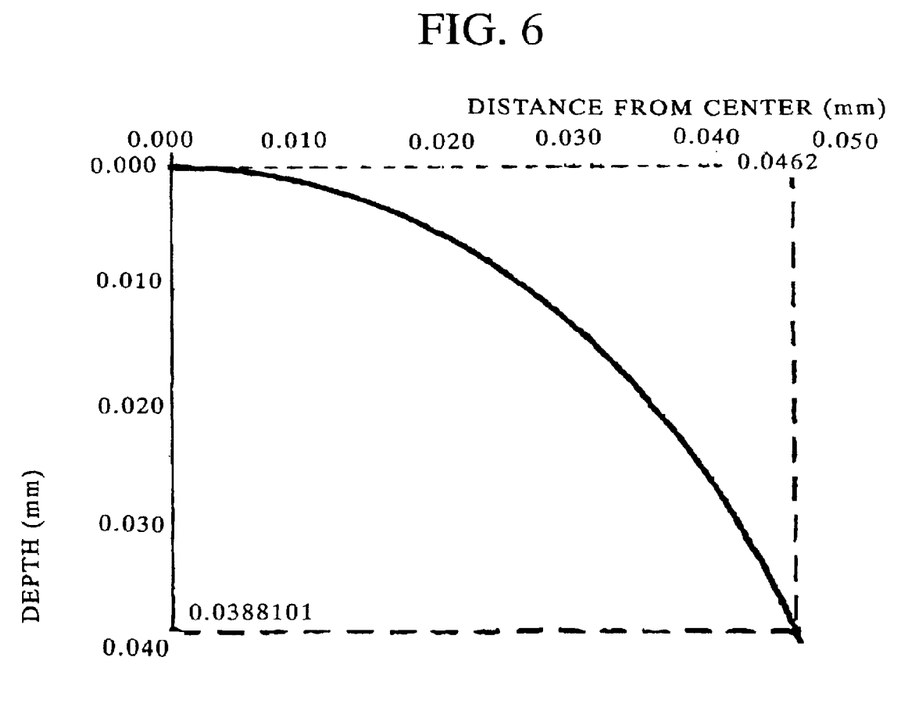
FIG. 6 is a curve showing an example for a cross sectional shape of a unit lens according to the present invention in which there is less chromatic difference of magnification.

FIG. 6 is a curve showing an example for a cross sectional shape of a unit lens according to the present invention in which there is less chromatic difference of magnification.

Here, in the micro-lens sheet according to the present invention, its usage is not limited to a transmission projection screen. That is, the micro-lens sheet according to the present invention can be used for a light guiding member for controlling a lighting light from the light source in a uniform brightness and in a uniform emission direction in a display screen in a display having a built-in light source such as a backlight in a non-large size (30 inch size like in a transmission/reflection projection screen) transmission projection screen.

Operation

According to optical characteristics corresponding to shape of an unit lens, in case of rear projection secreen, it is preferable that emission direction of the display light is controlled so as to be wide to an optical axis (normal direction to a screen main surface) in that the perspective scope can be widened without depending on light diffusing agent and a cost for a screen does not increase because a lot of light diffusing agent is not necessary.

In the present invention, light emission angle of each lens is wider than ±30 degrees to an optical axis; therefore, it is possible to obtain necessary perspective angle characteristics for a transmission screen. Furthermore, following operational effect is anticipated.

Improvement in BM Ratio

As explained above, BM pattern can be formed by using light condensing patter by self-alignment method in case in which parallel lights are incident to fine lenses on a micro-lens sheet. In a fine unit lens having chromatic difference of magnification according to the present invention, it is possible to make an aperture area quite small.

Figure 7:
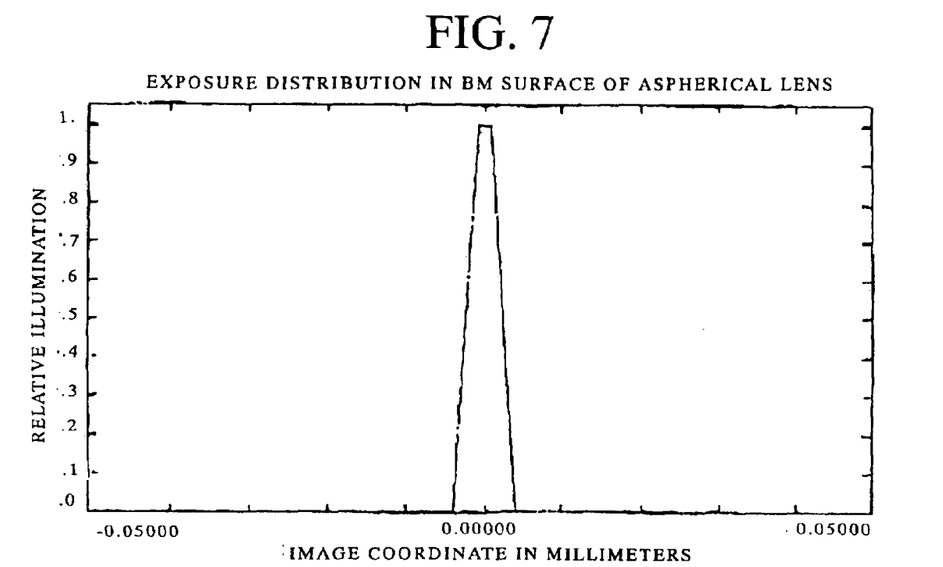
FIG. 7 is a graph showing a distribution of exposure on a BM surface in case in which a unit lens has an aspherical shape as defined in the present invention.

FIG. 7 is a graph showing a distribution of exposure on a BM surface in case in which a unit lens has an aspherical shape as defined in the present invention. Here, the shape of the light condensing section is in a pulse wave form; thus, a borderline between the light condensing section and the non-light-condensing section is clear. In order to form BM by a self-alignment method, it is possible to recognize a shading layer forming section and a shading layer non-forming section according to whether or not there is an adhesive section of the photosensitive adhesive easily. Therefore, it is possible to form a shading pattern clearly. By doing this, it is possible to obtain BM having high shading ratio (75% or higher); thus, it is possible to obtain a screen which can display high contrast image easily.

Under condition that a borderline between a surface on which BM is formed (in case of self-alignment method, a surface of photosensitive member) and a base member for lens sheet is defined as a "focusing surface", by limiting the fluctuation range of the chromatic difference of magnification in 50% of the diameter of a unit lens or lower, it is preferable to form BM in 75% of BM area ratio (shading ratio) or higher. Furthermore, by limiting the fluctuation range of the chromatic difference of magnification in 31% of the diameter of unit lens or lower, it is preferable to form BM in 90% of BM area ratio (shading ratio) or higher. Thus, it is possible to improve not only contrast but also S/N greatly.

Improvement in Product Yield

When BM is formed by self-alignment method, more lights are condensing because of smaller aberration due to spherical lens. Therefore, illumination in the exposed section increases; therefore, S/N to an external light (non-parallel light emitted through the unit lens) improves. As a result, it is possible to obtain a lens sheet having accurate shading pattern which is quite independent to disturbance such as the external lights.

Also, by disposing a lower refractive index layer than that of the lens sheet as a photosensitive member layer, and by adjusting the thickness of the lower refractive index layer, it is possible to adjust the accuracy of BM easily.

Embodiments in the present invention are explained as follows with reference to drawings.

First Embodiment

Figure 12:
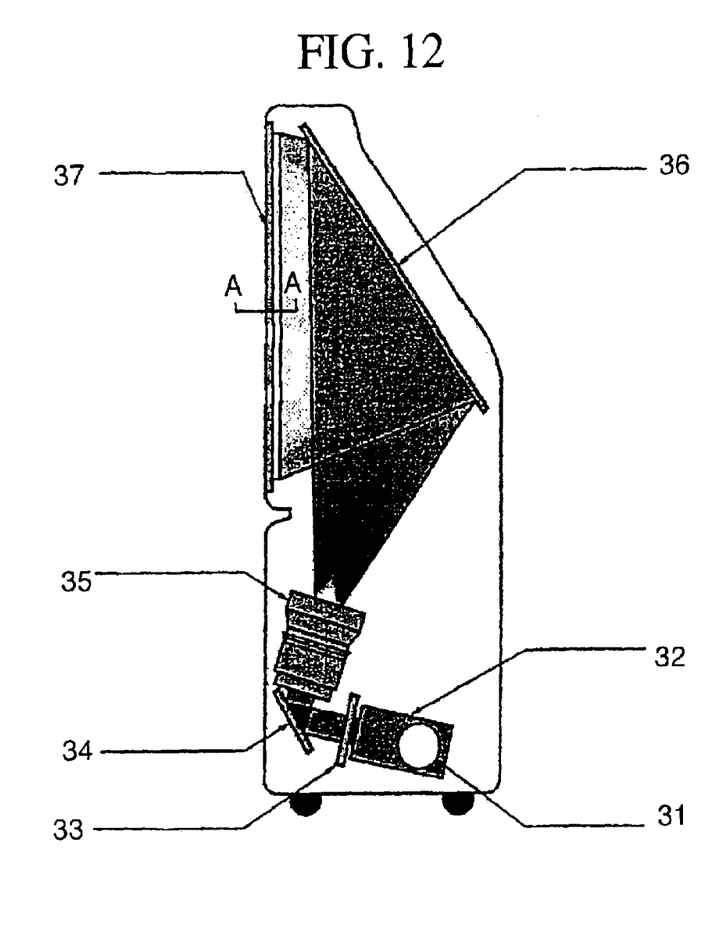
FIG. 12 shows an example for a rear projection displaying device using the micro-lens sheet according to the present invention.
Figure 13:
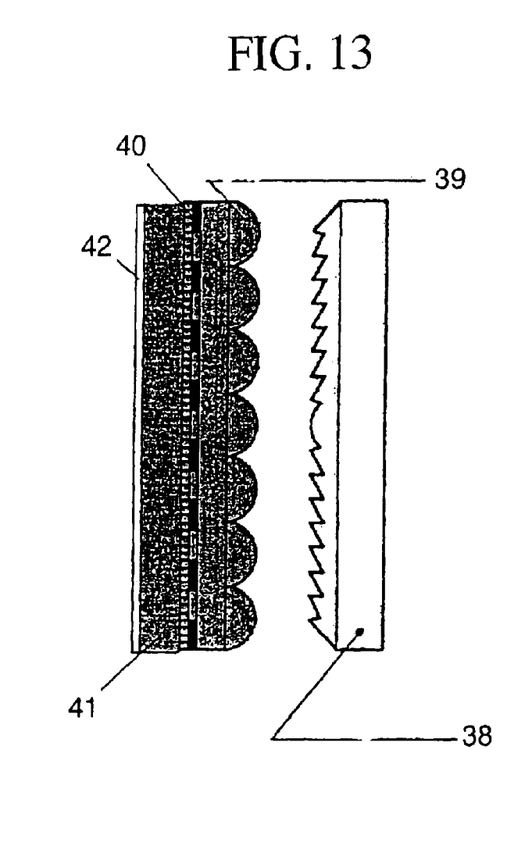
FIG. 13 is a view showing structure of a screen in the projection displaying device using the micro-lens sheet according to the present invention.

FIG. 12 is a cross section showing a general structure of a liquid crystal rear projection television. Reference numeral 31 is a light source lamp. Reference numeral 32 indicates an optical structural section. Reference numeral 33 indicates a liquid crystal panel. Reference numeral 34 indicates a first mirror. Reference numeral 35 indicates a projecting lens. Reference numeral 36 indicates a second mirror. Reference numeral 37 indicates a screen. FIG. 13 is a cross section viewed in A-A section in the screen 37. In FIG. 13, Reference numeral 38 indicates a Fresnel lens. Reference numeral 39 indicates a micro-lens. Reference numeral 40 indicates a black matrix section. Reference numeral 41 is a protection layer. Reference numeral 42 indicates a hard-coat section.

Figure 1A:
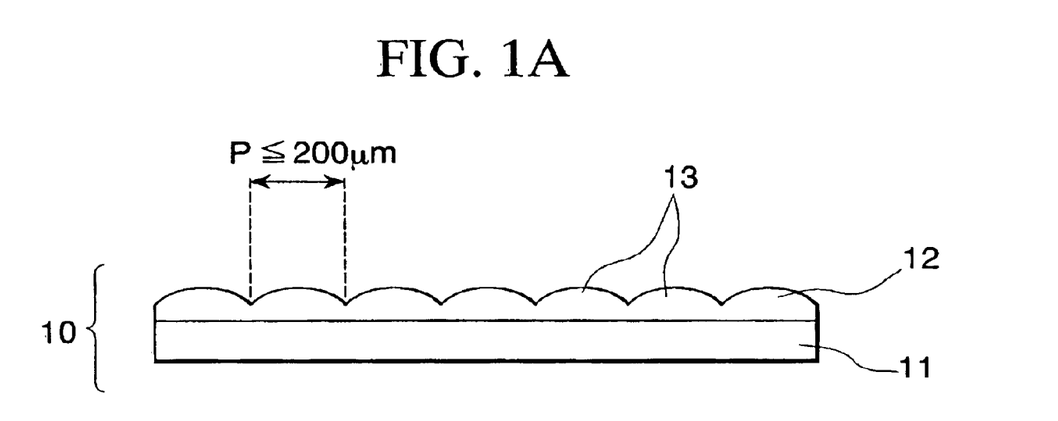
FIG. 1 is a cross section showing an example of a micro-lens sheet according to the present invention.
Figure 1B:
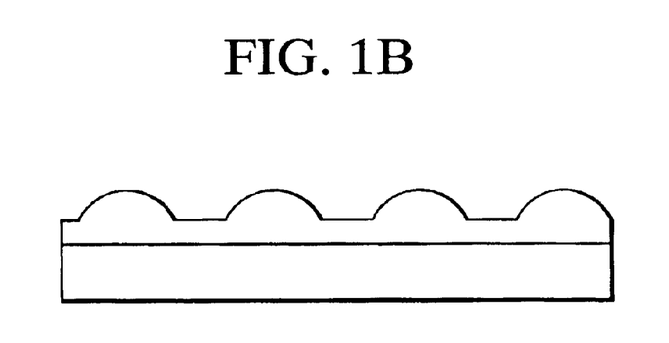

FIGS. 1A and 1b are cross sections showing a micro-lens sheet 10.

On one surface of a base board 11, the micro-lens array section 12 made from a reacted product of radioactive-ray-curable-resin is bonded. In the micro-lens array section 12, unit lenses 13 having an aspherical surface are disposed in 200 µm pitch or shorter (preferably 100 µm or shorter).

In FIG. 1A, the neighboring unit lenses 13 are contacting each other. As shown in FIG. 1B, it is acceptable that the neighboring unit lenses 13 are separated.

Unless there is a requirement for fine resolution such that the unit lenses 13 are disposed in 100 µm pitch or shorter, there is no necessitiy that the micro-lens array section 12 is formed by a reacted product of a radioactive-ray-curable-resin; thus, it is acceptable that the micro-lens array section 12 is formed by performing press molding operation to a surface of the thermoplastic resin sheet.

FIGS. 2A to 2D are plan views showing a micro-lens sheet 10 shown in FIG. 1.

Unit lenses 13 are disposed in an approximate matrix form having 200 µm pitch or shorter on a surface of the base board 11. There is no limitation in the disposition. Matrix disposition such as a neat grid condition, delta disposition as shown in FIGS. 2B and 2C, honeycomb disposition shown in 2D using hexagonal unit lens are acceptable.

In the drawings, it is defined that the neighboring unit lens area indicates a case in which unit lenses contact by member (of rectangle such as hexagon, etc.)

Figure 2A:
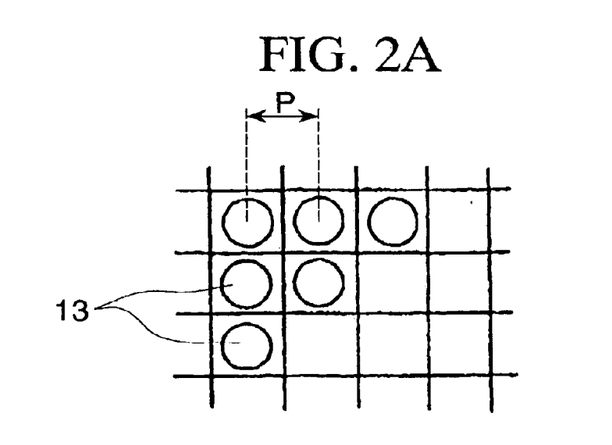
FIG. 2 is a plan view showing a micro-lens sheet shown in FIG. 1.
Figure 2B:
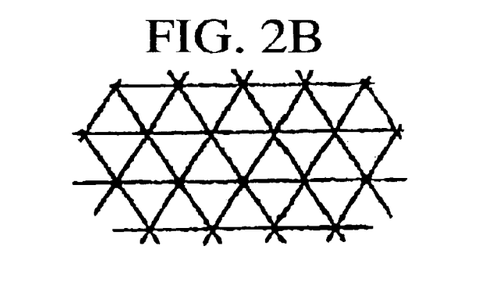
Figure 2C:
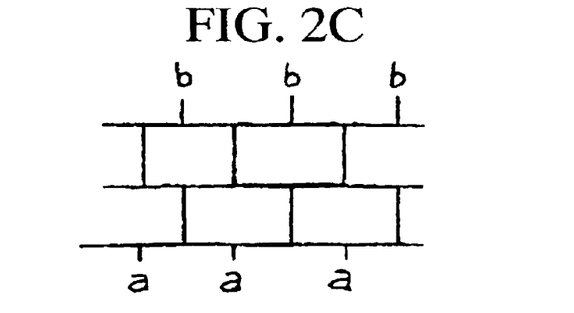
Figure 2D:
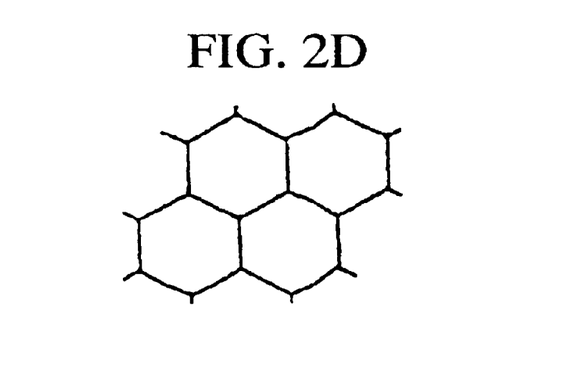

Here, the shape of the unit lens defined in the present invention is rectangle as shown in FIGS. 2A and 2C. In case of FIG. 2B, the shape of the unit lens defined in the present invention is a triangle. In case of FIG. 2D, the shape of the unit lens defined in the present invention is hexagon. In case of FIG. 2A, a lens section (curvature) which is indicated by a circle in the unit lens is provided. It is acceptable that overall unit lens having shapes such as rectangle, triangle, hexagon constructs a lens section (curvature). Here, it is defined that neighboring unit lenses indicate a case in which the unit lenses are contacting by their member of rectangles in a case of FIGS. 2A to 2D. Also, it is defined that disposition pitch between the unit lenses indicates a distance between centers of the unit lenses.

In cases of FIG. 2a (square), FIG. 2B (regular triangle), FIG. 2D (regular hexagon), disposition pitch between the neighboring unit lenses is uniform. In case of FIG. 2C (rectangle), it is understood that the disposition pitch of the unit lenses in an array n and the disposition pitch of the unit lenses in an array n and an array n+1 are different.

Here, in case of disposition shown in FIG. 2A, as explained in a case of FIG. 1, it is anticipated that the neighboring unit lenses 13 are contacting. Also, it is anticipated that the neighboring unit lenses 13 are separating.

In cases of dispositions shown in FIGS. 2B, 2C, and 2D, there is a finer periodicity (periodicity of 100 µm made by a combination of period a and period b in an example shown in FIG. 2C) than that of the disposition pitch (tentatively, 100 µm) between the unit lenses 13. Thus, moiré which is caused by pitch ratio in the projected pixel from the projector can be further reduced; therefore, the present invention is superior.

In order to produce such a micro-lens sheet 10, a molding stamper is manufactured, and after that, molding method such as press molding method, extruding method, or photo-polymer method (hereinafter called 2P method) is employed.

The above stamper has a counter-shape of the micro-lens sheet 10 (that is, surface shape for corresponding to the unit lens section is in concave shape). In order to manufacture such a stamper, a method for engraving a concave section on a surface of a metal layer by using a machine (or eroding chemically) or a method for engraving the concave shape by using a laser can be used.

In any methods, it is not necessary to say that it is necessary to form the shape of the curvature of the unit lens accurately; therefore, a suitable method is selected according to the purpose (fineness).

Also, a position of a valley part from a top of the lens (distance from a surface of a base member) is determined by curvature shape of the unit lens. In case in which the unit lens is in a symmetric square shape or symmetric hexagonal shape, such as position differs around the unit lens.

The shape of curvature of the unit lens may be spherical or aspherical. Also, it is necessary to control the shape of the concave section severely such that the diffusing characteristics in a horizontal direction and a vertical direction should be controlled so as to be different each other.

Also, in order to form a shading layer on a flat surface of the base board 11 which is disposed on the micro-lens sheet 10 so as to be away from the lens section, a method in which a photosensitive layer (a known member of which adhesion is lost by exposing a light) is formed on entire surface of the flat surface, and the photosensitive layer is exposed by the micro-lens array so as to change the characteristics of the photosensitive layer in an area corresponding to a light-condensing section, and ink and a toner are attached to an area as a non-light-condensing section (know method called self-alignment by the lens it self) is preferable so as to form a shading layer in accurate positions (not shown in the drawings).

Second Embodiment

Figure 5:
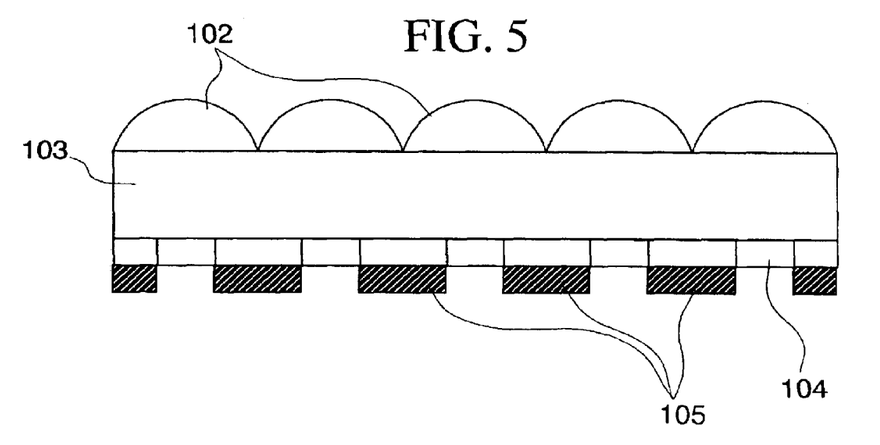
FIG. 5 is a cross section showing an example for a micro-lens sheet according to the present invention.

FIG. 5 is a cross section showing an example for a micro-lens sheet 101 according to the present invention.

On one surface of a transparent supporting member 103, a lens section (unit lens group) 102 is formed by using a reacted product of radioactive-ray-curable-resin. A shading patter (BM) 105 having an aperture in a spot manner is formed in a position corresponding to a non-lightcondinsing section by each of the unit lens on a flat surface which is opposite to the transparent supporting member 103 via a positive photosensitive adhesive layer 104.

For a transparent supporting member 103, polyethylene terephthalate (PET) or polycarbonate (PC) can be named.

It is preferable that the diameter of the unit lens and its disposition pitch are 200 µm or less so as to obtain a screen which is suitable for observing the fine resolution image.

Such a fine pitch operation can be obtained by performing a molding operation for forming a lens according to 2P method (photo-polymer method) by using the hardened product of the radioactive-ray-curable-resin.

In an example shown in FIG. 5, a lens section having aspherical shape with 80 µm diameter is formed on one surface of the transparent supporting member 103 having 1.50 refractive index and 75 µm thickness according to 2P method by using the hardened product of the radioactive-ray-curable-resin.

In a case of example shown in the above drawings, the maximum width of the chromatic difference of magnification is 6 µm (7.5% to the diameter of lens); thus, it is possible to form BM with 92.5% of shading ratio.

Even if the same material is used in the same dimension, in case in which the shape of the unit lens is spherical, the maximum width of chromatic difference of magnification is 30 µm (37.5% to the diameter of the lens); thus, the maximum available shading ratio of BM is 62.5%.

By using by one piece of the above micro-lens sheet or a plurality of micro-lens sheet in a connected manner in a rear projection displaying device having 30 inch size or larger, it is possible to watch high contrast image with wider perspective angle.

In case of a micro-lens sheet, comparing to a case of lenticular sheet having cylindrical lens group, the connected part of the lens sheets do not look seamy; thus, there is less disadvantage for a large-size display.

Also, in the above case, a Fresnel lens sheet is disposed to a projector as an image light source, it is possible to shorten the distance between the projector and the screen when parallel lights are incident to the micro-lens sheet. By doing this, it is possible not only to reduce the size of the displaying device but also emit the displaying image light having high brightness only to a necessary range; thus, it is preferable.

Also, in the above case, it is acceptable that a light diffusing layer in which a light diffusing agent is dispersed is disposed in the Fresnel lens and/or the micro-lens sheet.

For a light diffusing agent to be used here, a particle made from inorganic member such as silicon, aluminum, calcium, inorganic powder and glass beads containing oxide of these member, organic member such as acrylic resin, styrene resin, polycarbonate resin, acrylic/styrene copolymer resin can be named.

In order to select the light diffusing agent, it is necessary to take following factors into account such as optical characteristics such as refractive index difference to a binder resin, illumination on its surface, dispersion for forming a light diffusing base member or light diffusing ink, and fragility during a molding operation. For an average diameter of the particle, 5 µm or larger is preferable. More preferably, 5 to 20 µm, further more preferably, 5 to 10 µm is preferable.

By compatibly use the light diffusing layer, it is possible to control the perspective angle by alleviating the steepness of the brightness reduction even in distant observing direction. Also, there is an improvement in focusing function by using gaps (mat surface) in a fine lens array. In addition, there is an improvement in focusing function for image light.

The finer the unit lens is, the more similarly the surface of the lens section of the micro-lens sheet works. Therefore, there is less dependency to the light diffusing layer using the light diffusing agent. In contrast, in a case in which there is not sufficient focusing characteristics and light diffusing characteristics only by the surface of the lens, the light diffusing layer is compatibly used.

Also, for a projection screen, the above micro-lens sheet can be used not only to a rear projection displaying device but also to a front projection displaying device having 30 inch size or larger if the micro-lens sheet.

When the above micro-lens sheet is used for a reflection screen, a light diffusing layer is formed on an entire surface of the micro-lens sheet away from the lens section.

Furthermore, it is possible that the above micro-lens sheet is used for a light guiding member for controlling the lighting light from the light source such that the lighting light is emitted so as be in a uniform brightness in a uniform emitting direction in a display screen.

For such a representative displaying device, a liquid crystal displaying device (monitor or mobile terminals, etc.) having a backlight can be named.

Third Embodiment

Embodiments of a projection screen as an example for the present invention is explained as follows with reference to the drawings.

Figures 8A, 8B:
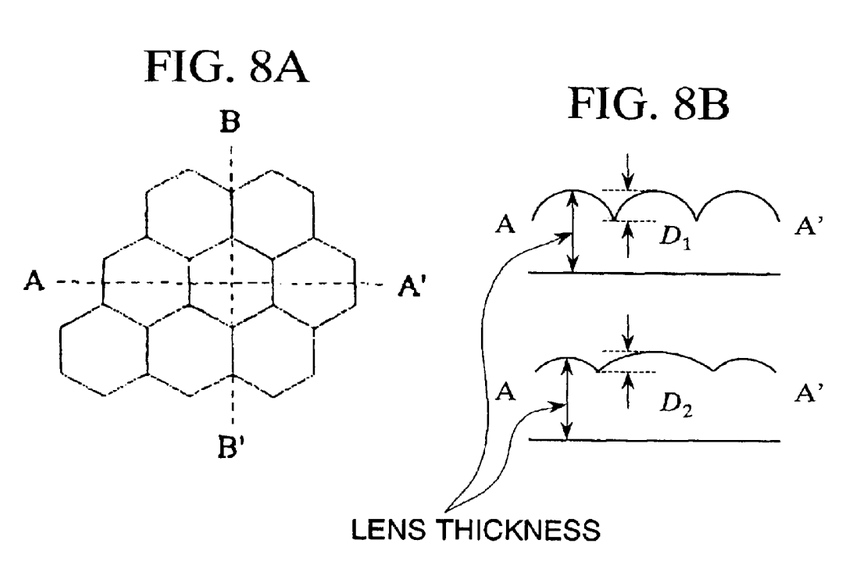
FIGS. 8A and 8B are general views for a micro-lens sheet used in a projection screen according to the present invention.

FIGS. 8A and 8B are general views for an element lens of a micro-lens sheet used in a projection screen according to the present invention.

Figure 9:
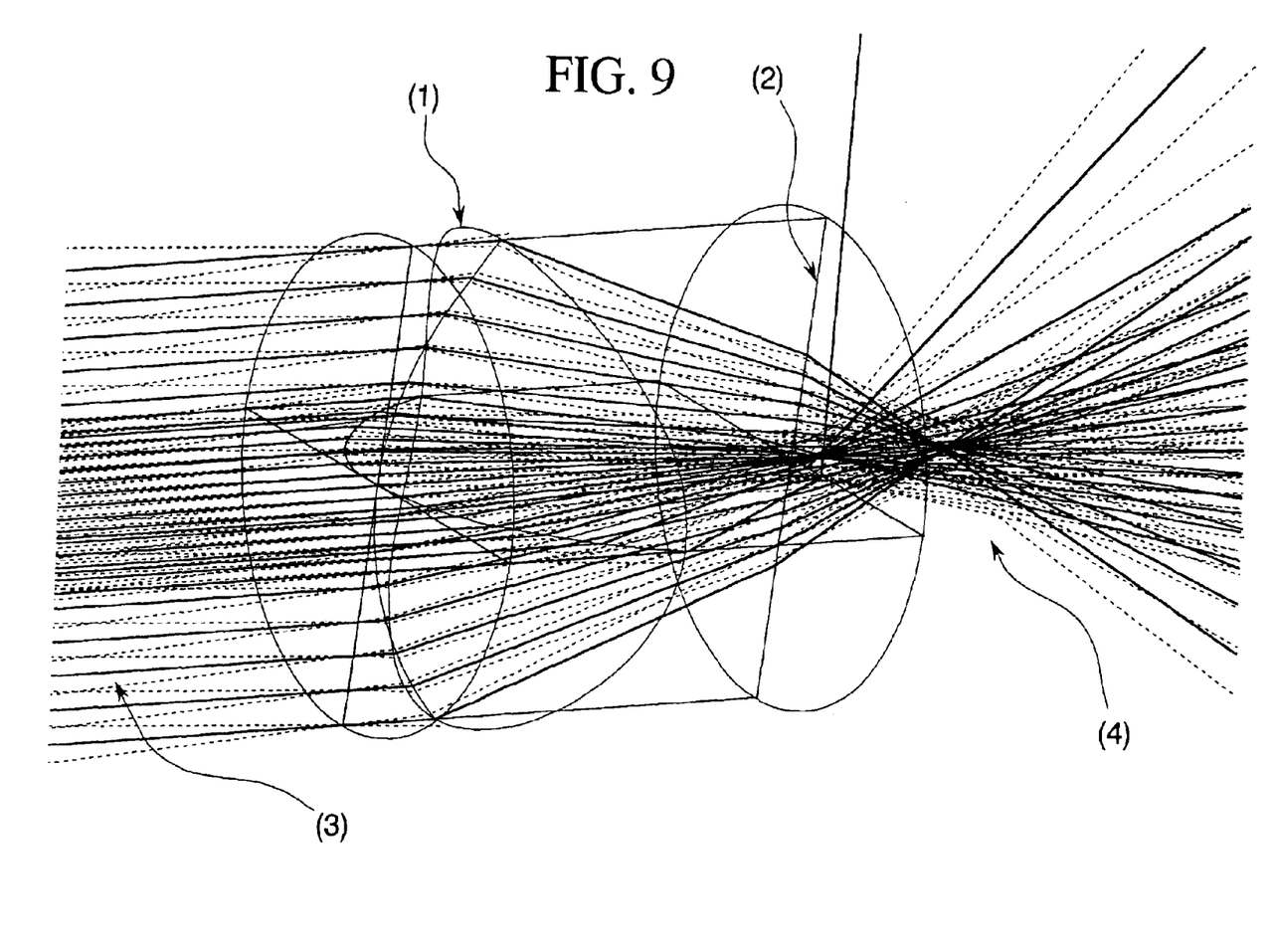
FIG. 9 is a perspective view of an element lens contained in the micro-lens array sheet used in the projection screen according to the present invention.

FIG. 9 is a perspective view of an element lens contained in the micro-lens array sheet used in the projection screen according to the present invention.

Figure 10:
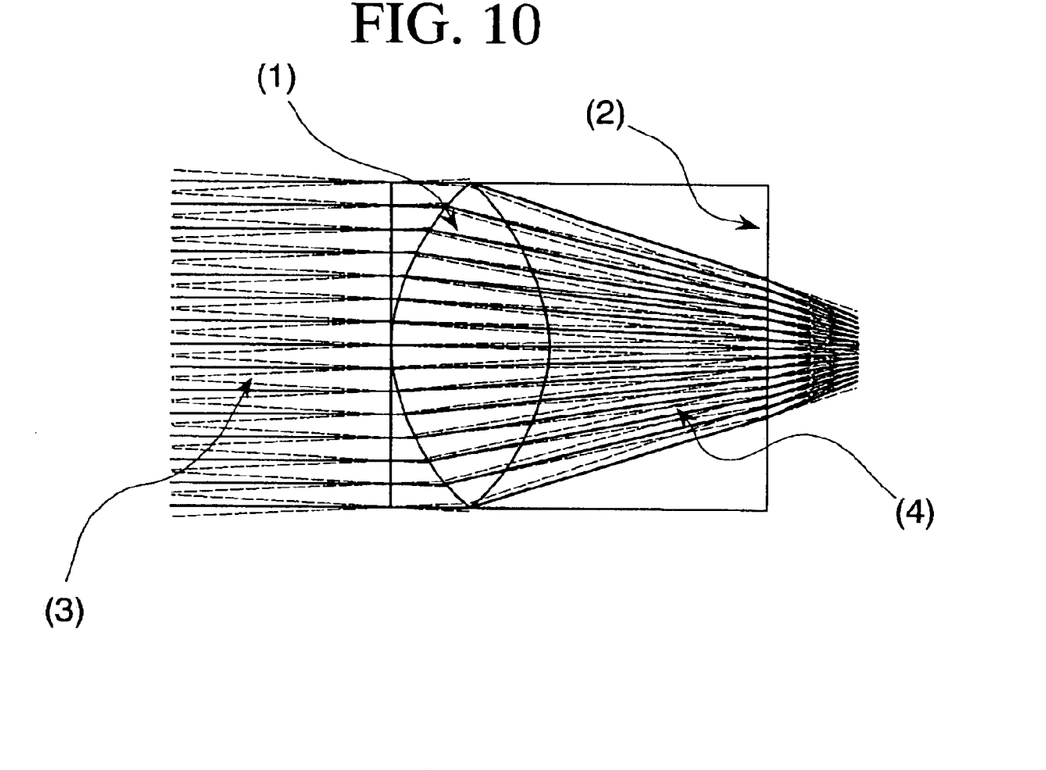
FIG. 10 is a cross section of an element lens in a vertical direction contained in the micro-lens array sheet used in the projection screen according to the present invention.

FIG. 10 is a cross section of an element lens in a vertical direction contained in the micro-lens array sheet used in the projection screen according to the present invention.

Figure 11:
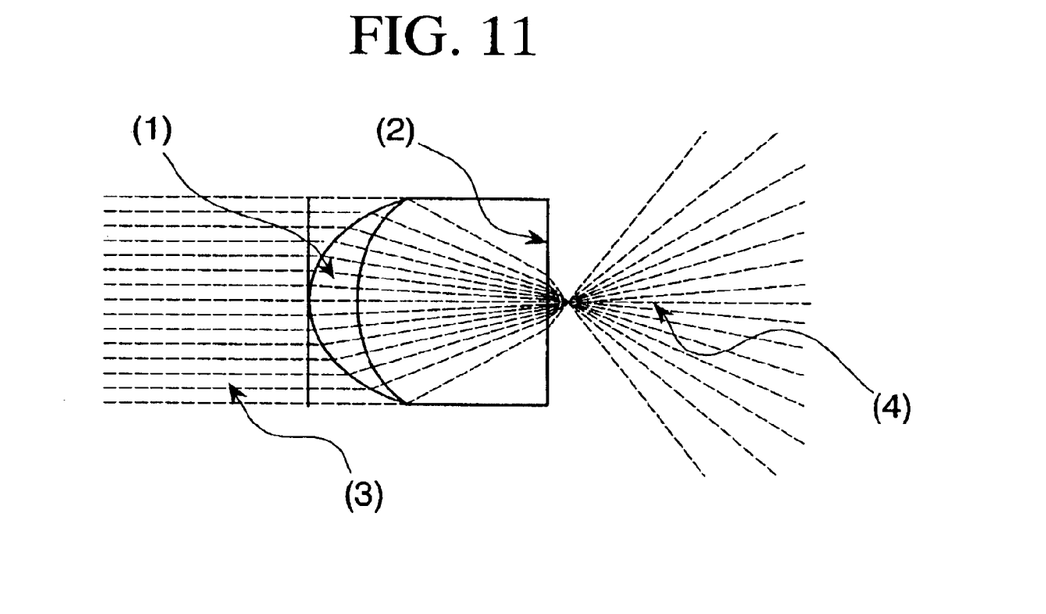
FIG. 11 is a cross section of an element lens in a horizontal direction contained in the micro-lens array sheet used in the projection screen according to the present invention.

FIG. 11 is a cross section of an element lens in a horizontal direction contained in the micro-lens array sheet used in the projection screen according to the present invention.

Here, regarding the lens array sheet shown in this embodiment, the shape of the lens are actually designed, and these drawings are made according to these designed lens shape.

In FIG. 8B, thickness (distance from a flat surface which is away from the lens surface to a top of the lens) of an entire lens sheet is uniform. In case of a unit lens having symmetric toric shape, the distance from the top of the lens to a valley part is different in distance D1 in A–A' cross section and distance D2 in B–B' even in the same unit lens.

Main feature of the lens array sheet is in a shape of the element lens contained in the lens array layer. The lens array layer comprises a base member layer in a board manner and a lens layer which is disposed near there.

The element lens contained in the lens array is in an aspherical shape. The element lens also is asymmetrical to an axis of the lens having geometrically three-dimensional shape. In its cross section, aspherical shapes such as not only aspherical shape, but also oval shape, parabolic shape, and an aspherical shape including higher terms are included.

By using such a lens having aspherical and asymmetrical shape, the incident light (3) which is incident in parallel direction to the element lens are refracted according to the incident position on a incident surface (1) due to difference of refraction angle at the time of light emission. As a result, it is possible to differentiate the refractive index of the light to an orthogonal axis of coordinates on a surface which is orthogonal to the optical axis (equivalent to a horizontal axis and a vertical axis in a screen which is disposed perpendicularly); therefore, it is possible to obtain a light distributing characteristics according to the purpose (see FIGS. 10 and 11).

More specifically, as shown in FIGS. 10 and 11, there is a phenomena that the light condensing position of the emitted light (4) is different in a thickness direction. The light emission angle of the light at that time is equivalent to the light distributing angle characteristics.

For a lens array layer, plastic member which is as transparent as plastic member and glass member is preferable. Furthermore, a plastic member which can be limitlessly used for an optical member is more preferable from a production efficiency point of view.

For such a plastic member, acrylic resin such as polymethyl_methacrylate, polycarbonate resin, acrylic-styrene copolymer, styrene resin, polyvinyl chloride resin can be named.

Also, for a member for a lens layer, a radioactive-ray-curable-resin such as an ultraviolet-ray-curable-resin or an electronic-ray-curable-resin should preferably be used because it is possible to perform a fine-pitch-forming operation. For such a radioactive-ray-curable-resin, for example, components containing urethane (meth) acrylate, and/or epoxy (meth) acrylate oligomer to which a reacted diluted agent, photopolymerization starting agent, optical sensitizer are doped can be used. An urethane (meth) oligomer, although there is no particular limitation, can be obtained reacting, by for example, polyols such as ethylene glycol, 1, 4-butanediol, neopentyl glycol, polycaprolactone polyol, polyester polyol, polycarbonate diol, polytetramethylene glycol, and polyisocyanates such as hexamethylene diisocyanate, isophorone diisocyanate, tolylene diisocyanate, xylene isocyanate. Epoxy (meth) acrylate oligomer can be obtained by reacting epoxy resins such as bisphenol-A type epoxy resin, bisphenol-F type epoxy resin, phenol novolak type epoxy resin, terminal glycidyl ether of bisphenol-A type propylene oxide adduct, and fluorine epoxy resin and (meth) acrylic acid.

A lens array layer can be produced, for example, as follows. A radioactive-ray-curable-resin is applied on a base member layer made of a plastic member under condition that the radioactive-ray-curable-resin is not hardened. From above there, a molding stamper is pushed, and a predetermined radioactive ray is emitted so as to harden it. Thus, a lens layer is formed.

A molding stamper can form a lens layer, for example, in a following manner. By using a photo-lithography method, at first, a plurality of mask on which a cross sectional shape for the element lens is patterned are prepared. By using the masks, silicon wafers are exposed consequently. After that, by performing an etching operation such as RIE. Patterning operations are repeated in its depth direction; thus, a molding stamper having a designed shape can be obtained.

As explained above, a lens array sheet layer can be produced by the same method as used for producing a conventional lenticular lens.

A photosensitive resin layer and a shading layer can be produced as follows. Fresnel lenses are disposed in parallel under the same condition as the practical use for a projection screen. A light is emitted from the lens layer of the lens array sheet via the Fresnel lenses. The characteristics in the photosensitive resin layer in a part which is exposed by the light which passes through the lens array layer changes, and adhesive characteristics is lost. The, a transfer film having a black transfer layer containing a black carbon is pushed to the photosensitive resin layer. Accordingly, the transfer layer is transferred to an unexposed region having adhesive characteristics selectively. Thus, the shading layer is formed.

The shading layer is formed corresponding to the focusing pattern in a line-segment state due to the light condensation because of the toric micro-lens. The position of such focusing pattern represents an astigmatism due to the toric microlens approximately. Therefore, the focusing pattern appears in two points in an optical axis direction (thickness direction). Among these focus points (called, in a field of geometric optics, a sagital focus point and a meridional focus point), the most preferable position for forming the lens sheet is adjusted by performing a sandwiching adjustment for low refractive index layer (otherwise, the lens is designed a such). By disposing a black shading layer in this position, it is possible to obtain a high rate BM pattern. Here, a lower refractive index layer is used. This is because of its weak refractive force; thus it is possible to anticipate larger tolerance for thickness; therefore, it is possible to improve its formability.

Consequently, on this shading layer, by disposing an adhesive agent layer, light diffusing layer, and a hardcoat layer according to necessity, it is possible to obtain a lens array sheet.

As explained above, in this lens array sheet, by preferably designing a shape of one toric lens array, it is possible to control the light distributing characteristics (perspective angle) of a light which transmits through the lens array sheet in both a horizontal direction and a vertical direction. In particular, by making its ratio at 2/3 or lower, it is possible to distribute the vertical/horizontal light distributing characteristics for a preferable projection screen. Thus, it is possible to obtain preferable characteristics for a screen.

Furthermore, it is possible to reduce cost for members used in the production and manufacturing process compared to a case in which two lens layers are used or the lens layers are formed on both surfaces of the base member layer.

Also, by simplifying the light diffusing layer, it is possible to reduce the absorption of the light or decrease of gain in the light diffusing layer. As a result, it is possible to control white-scattering phenomena which is caused by the light diffusing layer; thus, it is possible to realize high S/N ratio.

Furthermore, by adding the Fresnel lens, it is possible to shorten the emission distance from the projector. By establishing such compatibility, it is possible to obtain a superior screen.

Here, there is no particular limitation in factors such as thickness of each layer of the lens array sheet according to the present invention, and pitch of the lens array. These factors can be changed preferably.

Experimental Example

The present invention is explained with reference to experimental example more spedifically as follows.

In this experimental example, designing parameter is determined as follows. Effect in the present invention is examined.

Designing Parameter

In a base member layer of the lens array layer is made from polyethylene terephthalate with 0.075 mm thickness. Lens layer in the lens array layer is made such that the material is UV photosensitive resin, pitch between the lenses is 0.080 mm, the shape of cross section in which the lens thug (height of convex section of the lens) is large (corresponding to a horizontal direction in the screen) is oval, the cross section in which the lens thug is small is spherical, ratio of thug amount is 2:1 so as to form a toric shape. For a photosensitive resin layer, a Cromalin film (Trademark, registered by DUPONT) having 20 μm thickness is used.

To a surface of the lens on this lens array sheet, parallel light which is collimated in 1 to 5 degrees is emitted so as to perform a patterning operation for the photosensitive layer. Then, a black film having 2 μm thickness (transfer film of carbon black) is transferred so as to be a shading layer; thus, it is possible to obtain a shading layer having an aperture corresponding to a micro-lens contained in the lens array.

The lens array surface of the lens array sheet which is obtained in this way is disposed toward the light source. By using the lens array sheet for diffusing the light, it is possible to observe that the perspective angle corresponding to a shape of the lens array can be obtained respectively.

Industrial Applicability

The micro-lens sheet according to the present invention is suitable for producing a rear projection screen having simple structure in which two lens sheets are assembled in combination with a Fresnel lens. It is preferable to watch high resolution quality image without moire.

According to the micro-lens sheet in the present invention, it is possible to control the light emission direction (range) of the display light from the lens section so as to be wide in a perspective range by disposing the unit lens group in fine pitch such as 200 μm or shorter.

In particular, according to the present invention, it is easy to form a black matrix with fine pitch such that the borderline between the aperture section and the shading section is clear so as to form a black matrix having high shading rate (75% or higher) on the micro-lens sheet away from the lens section.

Furthermore, according to the micro-lens sheet having a micro-lens array section which is used for the projection screen according to the present invention, it is possible to control the light distributing characteristics of the transmitting light through the lens array layer in a vertical direction and a horizontal direction by preferably changing the shape of toric shape of the element base. This fact indicates that it is possible to control the optical characteristics of the screen positively; thus, there is a great effect in reducing the time and cost necessary for product development.

Also, it is possible to set the perspective angle independently in a vertical direction and a horizontal direction on one piece of micro-lens sheet desirably. Therefore, (1) it is possible to reduce the cost necessary for production and (2) it is not necessary to develop and prepare the necessary material because the amount of the light diffusing agent can be set according to the available material. Also, (3) it is possible to restrict the absorption of the light (light loss). Therefore, there is an effect in that it is possible to obtain a bright projection screen using the micro-lens sheet easily.

Also, it is possible to reduce the amount of the light diffusing agent comparing a case of the conventional screen. Therefore, reflection and scattering of the external light are restricted; thus, transparency increases. Therefore, light absorbing function in enhanced. Thus, it is possible to obtain a projection screen using the micro-lens sheet having conventionally unrealized improved S/N.

What is claimed is:

1. A micro-lens sheet having a micro-lens array section in which unit lenses are disposed in n approximate matrix in a second dimensional manner on at least one surface of a base board wherein:
   a diameter for each of the unit lens and a disposition pitch is 200 μm or shorter;
   a light emission angle which is emitted from each unit lens is more than ±30 degrees against a normal of a main surface of the micro-lens sheet;
   for each unit lens, a relationship is effective in which 0%< a ratio of a chromatic difference of magnification which is used by each unit lens ≦50% of the diameter of the lens.

2. The micro-lens sheet according to claim 1, wherein a shading layer is formed on another surface of the base board which is disposed away from the micro-lens array section such that a light-condensing section by each unit lens become an aperture section.

3. The micro-lens sheet according to claim 2, wherein the shading layer is formed so as to have an area which is 75% of an entire area of the micro-lens array section or larger.

4. The micro-lens sheet according to claim 2, wherein the shading layer is formed on a surface of a non-light-condensing section on a photo-sensitive resin layer in which the light-condensing n and the non-light-condensing section are formed according to the light-condensation of the micro-lens array section.

5. The micro-lens sheet according to claim 4, wherein the photo-sensitive resin layer is formed on a surface of the base board which is away from the micro-lens array section via a transparent resin layer having a lower refractive index than a refractive index of the base board or the photo-sensitive resin layer is directly formed on a surface of the base board so as to have a lower refractive index than the refractive index of the base board such that the photo-sensitive resin layer is disposed away from the micro-lens array section.

6. A front-projection screen which size is 30 inches or larger having the micro-lens sheet a according to claim 1 and a light-reflection layer which is disposed on a surface of the base board which is opposite to the lens.

7. A display device having a backlight having the micro-lens sheet according to claim 1 as a light-guiding member for controlling a light emission from a light source under a condition of uniform brightness or in a uniform emission direction in a display screen.

8. A projection screen having a micro-lens sheet having a micro-lens array section in which unit lenses are disposed in an approximate matrix in a second-dimensional manner wherein
   a surface of the unit lens is formed in a toric shape as a continuous surface such that a curvature of cross sectional shape of the unit lens in one direction is smaller than a curvature in an orthogonal direction to the particular direction;
   the micro-lens array section in which the unit lens is disposed in an approximate matrix in a second-dimension manner is formed on one surface of a transparent sheet;
   a shading layer having an aperture section of which an optical axis is aligned with an optical axis of unit lens group on a surface of the sheet which is disposed opposite to the micro-lens array sections; and
   a lens thug of toric surface is a ratio between a thickness of a curvature section in one direction and a thickness of a curvature section in a cross sectional surface in an orthogonal direction and is 2/3 or smaller.

9. The projection screen according to claim 8, wherein directions of the curvature of each unit lens are uniformly disposed when the micro-lens array section in which the unit lens is disposed in the approximate matrix in the second-dimension manner is formed on one surface of the transparent sheet.

10. The projection screen according to claim 8, wherein a lens thug of the toric surface is a ratio between a thickness of a curvature section in a horizontal direction and a thickness of a curvature section in a cross sectional surface in a vertical direction and is 2/3 or smaller.

11. The projection screen according to claim 8, wherein the micro-lens array section is formed a one surface of the transparent sheet which is disposed in an area from which a light is incident (near a projector) when the micro-lens array section is used for a transparent projection screen.

12. The projection screen according to claim 8, wherein:

the shading layer is formed in a non-light-condensing area on a surface of a base board opposite to the lens such that a light does not condense by exposing a light through the micro-lens array section; and a photosensitive resin layer or a layer which is formed on a surface of the photosensitive resin layer is the base board for the lens such that a refractive index of the layer is lower than a refractive index of the transparent sheet.

13. A projection screen further having a Fresnel lens having a concentric ring band near a light incident region (near a projector) when the projection screen according to claim 8 is used for a transparent projection screen.

14. A projection screen according to claim 13 wherein a shape of a unit lens area is triangular, hexagonal, a rectangular.

* * * * *

UNITED STATES PATENT AND TRADEMARK OFFICE
CERTIFICATE OF CORRECTION

PATENT NO. : 6,970,288 B2  
DATED : November 29, 2005  
INVENTOR(S) : Kazuyoshi Ebina et al.

It is certified that error appears in the above-identified patent and that said Letters Patent is hereby corrected as shown below:

Column 15,  
Line 59, delete "n" and insert -- an --.

Column 16,  
Line 3, delete "used" and insert -- caused --.  
Line 15, delete "n" and insert -- section --.  
Line 53, after "of" insert -- the --.

Column 17,  
Line 2, after "formed" delete "a" and insert -- on --.

Column 18,  
Line 9, after "hexagonal" delete "a" and insert -- or --.

Signed and Sealed this

Second Day of May, 2006

JON W. DUDAS  
*Director of the United States Patent and Trademark Office*